United States Patent [19]

Seizert et al.

[11] Patent Number: 5,156,783
[45] Date of Patent: Oct. 20, 1992

[54] TWO STAGE PROCESS FOR SULFONATING PLASTIC CONTAINERS

[75] Inventors: Robert D. Seizert, Brooklyn, Mich.; Glenn T. VanVolkom, Fairless Hills, Pa.; Mark Nulman, Birmingham; Donald L. Crites, Bronson; William S. Aseltine, Coldwater, all of Mich.

[73] Assignee: Solvay Automotive, Inc., Houston, Tex.

[21] Appl. No.: 643,028

[22] Filed: Jan. 18, 1991

[51] Int. Cl.$^5$ ............................................. B29C 71/00
[52] U.S. Cl. ................................... 264/83; 264/233; 264/340; 427/223; 427/237
[58] Field of Search ................ 264/83, 340, 233; 427/223, 237; 425/74

[56] References Cited

U.S. PATENT DOCUMENTS

| | | |
|---|---|---|
| 2,400,720 | 5/1946 | Staudinger et al. |
| 2,786,780 | 3/1957 | Walles et al. |
| 2,811,468 | 10/1957 | Joffre |
| 2,832,696 | 4/1958 | Walles |
| 2,937,066 | 5/1960 | Walles |
| 3,560,166 | 2/1971 | Walles .................. 264/340 |
| 3,613,957 | 10/1971 | Walles |
| 3,617,338 | 11/1971 | Caiola et al. |
| 3,740,258 | 6/1973 | Walles |
| 3,862,284 | 1/1975 | Dixon et al. |
| 3,947,539 | 3/1976 | Lane ........................ 264/83 |
| 3,998,180 | 12/1976 | Hawkins et al. .......... 427/237 |
| 4,014,831 | 3/1977 | Bock et al. |
| 4,157,432 | 6/1979 | Lundberg et al. |
| 4,220,573 | 9/1980 | Bock et al. |
| 4,220,739 | 9/1980 | Walles |
| 4,336,015 | 6/1982 | Rainville |
| 4,371,574 | 2/1983 | Shefford |
| 4,394,333 | 7/1983 | Fukushima et al. |
| 4,396,567 | 8/1983 | Rainville |
| 4,615,914 | 10/1986 | Walles |
| 4,666,452 | 5/1987 | Nohr et al. ............... 264/83 |
| 4,701,290 | 10/1987 | Eschwey et al. |
| 4,743,419 | 5/1988 | Bierschenk |
| 4,752,428 | 6/1988 | Williams et al. |
| 4,775,587 | 10/1988 | Walles |
| 4,861,250 | 8/1989 | Walles et al. |
| 4,880,675 | 11/1989 | Mehta ....................... 264/83 |
| 4,938,998 | 7/1990 | Stock ........................ 427/223 |
| 5,030,399 | 7/1991 | Walles ....................... 264/83 |

FOREIGN PATENT DOCUMENTS 3535602  4/1987  Fed. Rep. of Germany ........ 264/83

*Primary Examiner*—Jeffery Thurlow
*Attorney, Agent, or Firm*—Willian Brinks Olds Hofer Gilson & Lione

[57] ABSTRACT

A process for treating a container having a normally solid, polymer surface with a sulfur-containing compound is carried out in two stages. In the first stage, a first sulfonation treatment is conducted by: (i) contacting the surface at a temperature of about 115° to about 140° F. with a first sulfur-containing compound; and, (ii) washing the surface with an aqueous liquid. Optionally, in the first stage, after the surface is contacted with the first sulfur-containing compound, but before it is washed with the aqueous liquid, the surface may be contacted with a first neutralizing agent. In the second stage, a second sulfonation treatment is conducted by contacting the surface with a second sulfur-containing compound, a second neutralizing agent and washing the surface with an aqueous liquid. The second sulfur-containing compound and the second neutralizing agent may be the same as or different than the first sulfur-containing compound and the optional first neutralizing agent, respectively. The second sulfonation treatment is conducted in substantially the same manner as the first sulfonation treatment. The process is conducted for such a period of time and with such concentrations of the first and second sulfur-containing compounds, the optional first neutralizing agent and the second neutralizing agent, that the container has average permeability to unleaded gasoline of not greater than about 0.021 g/hr.

The surface, after the two stage process is completed, comprises about 200 to about 1500 micrograms of sulfur per square inch of the surface and it is penetrated by the sulfur-containing compound to an average depth of at least about 10 microns.

51 Claims, 7 Drawing Sheets

TWO STAGE PROCESS FOR SULFONATING PLASTIC CONTAINERS

BACKGROUND OF THE INVENTION

1. Field of the Invention

The invention is directed to a process for treating a container comprising a normally solid, plastic surface with a sulfur-containing compound at such conditions that the permeability of the container is substantially reduced, as compared to previously known processes. The invention is also directed to the container produced in the process.

2. Discussion of Related Art

Containers made of normally solid, plastic (i.e., made from polymer) materials are known in the art. Such containers have a variety of uses, e.g., they can be used for storing or transporting industrial chemicals, hydrocarbons, such as fuels, and similar liquids.

Plastic containers have several advantages over metal containers in a variety of applications, including transporting and storing hydrocarbon liquids. For example, plastic containers are more economical to manufacture and are more light-weight than metal containers, such as metal automobile gasoline tanks, thereby adding to fuel efficiency of the automobiles in which they are used. Additionally, they can be molded into a single piece, seamless article, thereby eliminating joined surfaces, such as seams, usually required in metal containers. Seams are particularly vulnerable to leaks and may become corrosion initiation points.

Additionally, plastic containers are not susceptible to corrosion by liquids. In contrast, metal containers are particularly susceptible to corrosion by liquids which they transport, particularly alcohols and flexible fuels, such as mixtures of gasoline and alcohol. For example, it has been estimated that metal, such as terne plate steel, fuel tanks for automobiles can last only about 3 to about 5 years if they are used to transport a fuel comprising a mixture of gasoline and methanol.

It was recognized in the art that plastic containers may be permeable to vapors produced by some of such liquids. For example, polyethylene, particularly high density polyethylene (HDPE), and high molecular weight, high density polyethylene (HMW HDPE), containers have been used as fuel tanks for hydrocarbon liquids, such as gasoline and alcohols and other fuels, including "flexible fuels." The term "flexible fuels" includes mixtures of hydrocarbon fuels, such as gasoline and alcohols, which are blended for specific purposes, such as reduction in emissions to meet environmental standards.

Accordingly, various treatments have been proposed to decrease the permeability of plastic containers to the vapors. For example, Walles U.S. Pat. Nos. 3,613,957 and 3,740,258, disclose enclosure members fabricated of non-aromatic, hydrocarbon polymers which are rendered substantially impermeable to gasoline, hydrocarbons and other organic materials by treating the enclosure members (containers) with a sulfonating agent, such as sulfur trioxide ($SO_3$), to decrease permeability thereof. The containers are treated to such an extent that, in the preferred embodiments, the sulfonate groups are present on the surface or surfaces of the containers in the concentration of about 0.06 to about 20, preferably from about 0.1 to about 1 milligram (mg.) of sulfur trioxide equivalents per square centimeter (e.g., see the '258 Patent). According to the teachings of both of these patents, the containers are treated with the sulfonating agent after they are fabricated by any suitable means, such as in a blow-molding process.

Walles et al., U.S. Pat. No. 4,861,250, disclose an in-mold sulfonation system for sulfonating the surface of plastic articles, such as plastic containers, during molding. In the sulfonation process, sulfur trioxide at a pressure exceeding that of the mold, is introduced into the mold, such as a blow-mold, immediately before or immediately following full expansion of the formed plastic article in the mold cavity. The sulfonation step is followed by the step of neutralization with a gaseous neutralizing agent, such as ammonia gas. The sulfonation step is conducted at a temperature of 160° to 80° C., because at that temperature a minimum amount of leachable salt is produced. Adequate sulfonation levels are described to be equal to or greater than 200 micrograms of sulfur trioxide ($SO_3$) per square centimeter. Walles et al. also state that 90% reduction in gasoline permeation rate of the blow-molded container is sufficient. That level is reached at about 22 micrograms of sulfur (S) per square centimeter ($cm^2$) at 72° F. and 50% relative humidity or at about 46 micrograms S per $cm^2$ at 100° F.

Walles, U.S. Pat. No. 4,615,914, discloses a method of treating plastic containers to provide increased barrier properties to organics and gases, such as oxygen. The method comprises treating the interior surface of the container with sulfur trioxide gas produced by inserting into the interior of the container a solid, particular material, which, upon heating, forms sulfur trioxide gas. The container is heated by a microwave energy or by any other suitable means to form sulfur trioxide gas from the solid material. After the sulfonation treatment, the sulfonated surface is treated with a suitable material to neutralize the sulforic acid groups formed on the polymer to prevent the reaction of the acid groups with materials which are later placed into the container. An example of a suitable neutralizing material is ammonia gas ($NH_3$).

Walles et al., U.S. Pat. No. 2,786,780, and Walles, U.S. Pat. Nos. 2,832,696, 2,937,066 and 4,775,587, also disclose methods of sulfonating plastic, such as polyethylene, materials for the purposes of decreasing permeability thereof to various materials, or to provide a suitable outside surface for adhering dyes or other coatings thereto.

Staudinger et al., U.S. Pat. No. 2,400,720, disclose the treatment of plastic surfaces or objects with concentrated sulfuric acid, fuming sulfuric acid, sulfur trioxide or chlorsulphonic acid to render such surfaces hydrophilic, thereby enabling the application of water-soluble dyes thereto.

Lundbert et al., U.S. Pat. No. 4,157,432, disclose a bulk sulfonation process comprising mixing a hydrocarbon polymer having olefinic unsaturation or aromatic moieties, or both, by mechanical means, in the absence of a solvent for the polymers, with a sulfonation reagent and at a sufficient temperature and time to effect the desired degree of sulfonation.

Bock et al., U.S. Pat. Nos. 4,014,831 and 4,220,573, disclose ionic polymer compositions which include a metal-neutralized sulfonated polymer plasticized with a preferential plasticizer.

Thus, plastic containers have heretofore been sulfonated to decrease permeability thereof after they were fabricated, e.g., in a blow-molding process. They were sulfonated by contacting the containers for a suitable period of time, e.g., about 150–160 seconds, at ambient temperature with a suitable mixture of a sulfonating agent (also referred to herein as a "sulfonating agent" or a "sulfur-containing compound") and an inert gas comprising, e.g., about 15% by mole of the sulfonating agent. Subsequently, the sulfonated surface was neutralized by a suitable neutralizing agent and washed with an aqueous liquid, such as water, to remove any leachable salts. The resulting container had surface sulfonation levels of about 200 to about 400 micrograms of sulfur per square inch (mcg/in$^2$). The thus-sulfonated containers had average permeability to unleaded gasoline of about 0.04 g/hr or to flex fuels (a blend of unleaded gasoline and methanol-M-10 or M-15) of about 0.08 g/hr.

The heretofore-available sulfonated plastic containers may be unable to meet newly-proposed environmental emission regulations, particularly when such containers are used for transporting flexible fuels, such as mixtures of gasoline and alcohol(s). For example, up to the present time, automobile industry has required plastic fuel tanks having sulfonation levels of between about 200 to about 400 micrograms of sulfur per square inch (mcg/in$^2$). Such levels are considered adequate for meeting current U.S. environmental emission standards limiting hydrocarbons emissions from the entire car to a maximum of 2 gram/2hr (g/2hr), if the car is powered by unleaded gasoline, as measured by the Shed Test, described in detail in SAE J171, June 1982, incorporated herein by reference in its entirety. Such sulfonation levels are also considered adequate for meeting current European and Japanese environmental regulations limiting the amount of hydrocarbon (e.g., unleaded gasoline) emissions from an automobile fuel tank to not greater than 20 grams/24 hrs. However, newly-proposed environmental emission standards are considerably more stringent. Additionally, due to recently enacted environmental legislation, such as Clean Air Act, limiting permissible level of hydrocarbon emissions, there is increased interest in the use of flexible fuels which are believed to produce lower emission levels in internal combustion engines. Plastic fuel tanks are more suitable than metal tanks for use as containers for such flexible fuels for the reasons discussed above, e.g., because plastic fuel tanks are not susceptible to corrosion. However, plastic fuel tanks are more permeable to flexible fuels vapors than to pure hydrocarbons, such as gasoline. Accordingly, plastic fuel tanks having sulfonation levels of about 200 to about 400 mcg/in$^2$ of sulfur, produced in accordance with the previously-used sulfonation processes, may be unable to meet the newly-proposed environmental restrictions.

Therefore, it is important to provide a plastic container, such as a plastic fuel tank, which can meet the newly-proposed environmental emission standards even with new flexible fuels, such as mixtures of hydrocarbon fuels and alcohols, e.g., gasoline and methanol or ethanol.

SUMMARY OF THE INVENTION

A process for treating a container, comprised of a normally solid, polymer surface, with a sulfur-containing compound, comprises two stages.

In a first embodiment, the first stage comprises a first sulfonation treatment which comprises the steps of:

(i) contacting the surface of the container at a temperature of about 115° to about 140° F. with a first sulfur-containing compound;
(ii) contacting the surface with a first neutralizing agent; and,
(iii) washing the surface with an aqueous liquid.

The second stage, conducted after the first stage, comprises a second sulfonation treatment which comprises the steps of:

(i) contacting the surface at a temperature of about 115 to about 140° F. with a second sulfur-containing compound;
(ii) contacting the surface with a second neutralizing agent; and
(iii) washing the surface with an aqueous liquid.

In an alternative embodiment, the first stage does not comprise the step of contacting the surface with the neutralizing agent.

In this alternative embodiment, the first stage comprises the steps of:

(i) contacting the surface of the container at a temperature of about 115° to about 140° F. with a first sulfur-containing compound; and
(ii) washing the surface with an aqueous liquid.

In this alternative embodiment, the second stage, conducted after the first stage, comprises a second sulfonation treatment which comprises the steps of:

(i) contacting the surface at a temperature of about 115° to about 140° F. with a second sulfur-containing compound;
(ii) contacting the surface with a neutralizing agent; and
(iii) washing the surface with an aqueous liquid.

The neutralizing agent used in the second stage of this embodiment is the same as the second neutralizing agent used in the second stage of the first embodiment, discussed above.

Both stages of all embodiments are carried out for a sufficient period of time and with sufficient concentrations of the first sulfur-containing compound, the second sulfur-containing compound, the first neutralizing agent (if it is used in the particular stage) and the second neutralizing agent, so that the container has average permeability, as defined hereinafter, to unleaded gasoline of not greater than about 0.021 grams/hr (g/hr), preferably not greater than about 0.016 (g/hr). The container also has modified average permeability, as defined hereinafter, of not greater than about 0.021, preferably not greater than about 0.014 g/hr.

The term "unleaded gasoline" as used herein means unleaded gasoline having octane number of 93, as calculated by the $$\frac{R + M}{2}$$

method.

The container having the aforementioned average and modified average permeability is obtained when the surface thereof, after the treatment with the two stage process of the invention, comprises about 200 to about 1500 mcg/in$^2$ of sulfur and when sulfur (from the sulfur-containing compound) has penetrated the surface of the container to an average depth of at least about 10 microns ($\mu$). The two stage process of the invention is also referred to hereinafter as the "two stage sulfonation process" or as "sulfonation process".

The invention is also directed to a container produced by a process of any embodiment of this invention.

Additionally, the invention is also directed to a container having walls of a normally solid, polymer surface which has average permeability to unleaded gasoline of not greater than about 0.021, preferably not greater than about 0.016 g/hr. Such a container has modified average permeability to unleaded gasoline of not greater than about 0.021 g/hr, preferably not greater than about 0.014 g/hr.

In one preferred embodiment, the polymer surface is made of a polymer comprising a linear carbon-to-carbon backbone structure with non-aromatic substituents having a plurality of free hydrogen atoms attached to the carbon atoms. In this embodiment, the polymer surface, after the two stages of the process are completed, comprises about 200 to about 1500, preferably about 500 to about 1500, and most preferably about 800 to about 1200 mcg/in$^2$ of sulfur. In one particularly preferred version of this embodiment, the container is a fuel container for an automobile made of high molecular weight, high density polyethylene having density of about 0.939 to about 0.959 g/cc, preferably about 0.945 to about 0.955 g/cc, and flow index ($I_{21}$) of about 4 to about 13, preferably about 7 to about 10 g/10 min.

The two stage sulfonation process of this invention provides great advantages. The process produces containers having reduced permeability to hydrocarbon fuels, including flexible fuels, as compared to prior art sulfonation processes. The containers produced in the process of the invention meet or exceed the environmental emission standards newly-proposed by the U.S. and foreign environmental regulatory agencies. The process of the invention produces such containers with a minimum modification of the existing sulfonation equipment, thereby requiring a limited amount of additional capital investment. Surprisingly, the containers produced by the process of the invention have the aforementioned low permeability levels, even though the measured sulfur content on the surface of the containers subjected to the two stage sulfonation process, in some cases, is not substantially higher than that of the containers sulfonated in accordance with the heretofore-practiced sulfonation processes.

BRIEF DESCRIPTION OF THE FIGURES

FIGS. 2-4 are photomicrographs of a cross-section of a wall of General Motors' ("GM's") L-type car fuel tank, made from HDPE, having density of 0.948 g/cc and $I_{21}$ of 8.5 g/10 min, and having average wall thickness of about 4.0 mm. The tanks of each Figure were subjected to different sulfonation treatments, detailed below.

DETAILED DESCRIPTION OF THE PREFERRED EMBODIMENT OF THE INVENTION

The containers which can be utilized in this invention may be any containers made of a normally solid, polymer material defining a normally solid, polymer surface. Suitable containers utilized herein are polymer fuel tanks for automobiles, aerosol cans for holding such consumer items as whipping cream, liquid soap, chemicals, and cosmetics, hoses for transporting chemicals, such as liquid fuels, solvents and natural gas, and containers for storing dry cleaning solvents and other hydrocarbon fluids, such as kerosene.

The term "a normally solid, polymer surface", as used herein, means a surface made of a polymer material which is solid at temperature of about −40° to about 230° F. The polymer materials which are used to make the containers are, for example, polymers comprising a linear carbon-to-carbon backbone structure with non-aromatic substituents having a plurality of free hydrogen atoms attached to the carbon atoms. Examples of such polymers are high density polyethylene and low density polyethylene, including linear low density polyethylene.

Preferred are polymers comprising a linear carbon-to-carbon backbone structure with non-aromatic substituents, e.g., homopolymers of ethylene, homopolymers of propylene, homopolymers of isobutylene, homopolymers of butene-1, homopolymers of methyl pentene-1, homopolymers of vinyl chloride, homopolymers of vinylidene chloride, copolymers of ethylene with propylene, copolymers of ethylene with isobutylene, copolymers of ethylene with butene-1, copolymers of ethylene with C$_5$-C$_{10}$ alpha-olefins, such as pentene-1, hexene-1 or octene-1.

The preferred copolymer is a high molecular weight, high density polyethylene (HMW HDPE), which is a polymer of ethylene, optionally comprising minor amounts of higher alpha-olefins, such as C$_3$-C$_{15}$ alpha-olefins, having density of about 0.939 to about 0.959, preferably about 0.945 to about 0.955 grams/cc (g/cc), and flow index ($I_{21}$) of about 4 to about 7, preferably about 7 to about 10 g/10 min. In one preferred embodiment, the HMW HDPE has density of 0.948 g/cc and $I_{21}$ of 8.5 g/10 min. The container subjected to the treatment with the sulfur-containing compound is made by any suitable process, e.g., by blow molding or extrusion. The polymer used for making the container may contain any conventional additives, such as antioxidants, pigments, dyes or extenders known in the art. Such additives are not expected to adversely affect the sulfonation process of this invention.

The term "average permeability to regular, unleaded gasoline of not greater than about 0.021 grams/hr." as used herein is preferably determined by an Isothermal Permeation Test, also referred to herein as a "modified Shed Test".

In the modified Shed Test a standard automobile fuel tank, designated by General Motors Company ("GM") for use on the L-type car (e.g., Chevrolet Corsica or Berreta), having about 14 to about 15 gallons capacity, having a GM part number 2569940, and made of high density polyethylene (density of 0.948 g/cc, melt index, $I_{21}$, of 8.5 g/10 min), having average wall thickness of about 4 millimeters (mm) is filled with unleaded gasoline, e.g., the Howell EEE fuel, a type of unleaded gasoline having octane number of about 93 (as calculated by the $$\frac{R + M}{2}$$

method), to the extent of about 40% of the tank's capacity. The fuel tank is conditioned by allowing it to stand, undisturbed, in a controlled environment at a temperature of about 104° F. (40° C.) for a period of twenty-one (21) days. During this time, the gasoline is periodically agitated. Thereafter, the permeability of the tank to the gasoline is measured. The tank's permeability is measured for one (1) hour at 104° F.±2° F. with the tank filled to about 40% of its capacity with the gasoline. The fuel tank is locked in a shed and maintained at the temperature of about 104°±2° F. Hydrocarbon emissions from the tank are measured and recorded for one (1) hour. The measurements, usually conducted over a period of 6-12 months, are averaged to obtain the measure of average permeability.

Alternatively, permeability may also be expressed in terms of "modified average permeability". Modified average permeability is the average of all the measurements except the lowest and the highest measurement. This measure is used in recognition of the fact that permeability of the tank may depend on extrinsic factors (not related to the measurement procedure), such as atmospheric conditions, human error, possible error in measurement techniques, which may, occasionally, produce anomalous results. Modified average permeability excludes such anomalous results.

Average permeability and modified average permeability may also be measured by the ECE 34 Test, discussed below in Examples 7-8, C (Comparative) and D (Comparative) or a Shed Test, discussed above. If the Shed Test or the ECE 34 Test are used, the values of average and modified average permeability are determined in the same manner as set forth above in connection with the determination of these values with the modified Shed Test method. If the Shed Test is used to measure these values, the results are expressed in g/2 hrs.

The aforementioned definitions of average permeability and modified average permeability are set forth herein for convenience and in recognition of the fact that permeability to any fluids, such as hydrocarbons, e.g., unleaded gasoline, may vary depending on the type of the material used to make the container, the type of fluid stored therein, the shape of the container and a number of other factors. These definitions of average permeability and modified average permeability provide those skilled in the art with a standard measure of permeability of their containers and the effectiveness of sulfonation processes used to reduce permeability of such containers.

These definitions also provide those skilled in the art with a ready means of comparing a given sulfonated container to the sulfonated container of this invention or a given sulfonation process to the sulfonation process of this invention. For example, if one wishes to determine whether the permeability of a container X, made from a polymer other than the HMW HDPE used to make the standard automotive fuel tank identified above, the container X having been treated with a sulfur-containing compound to reduce permeability of the container, falls within the average or modified average permeability levels defined above, one would manufacture the standard automotive fuel tank defined above (i.e., the GM tank for Chevrolet Corsica or Chevrolet Berreta having GM part number 2569940) from the above-defined HMW HDPE (i.e., having density of 0.948 g/cc and $I_{21}$ of 8.5 g/10 min), and treat the standard fuel tank with the same sulfur-containing compound and in the same manner as the container X. The average permeability and the modified average permeability of such a standard automotive fuel tank made from the HMW HDPE would then be determined in the manner defined above.

Similarly, if one wishes to determine whether a given sulfonation process satisfies the definition of the sulfonation process defined herein, one would conduct such a given process on the standard automotive fuel tank defined above, made from the HMW HDPE defined above. Subsequently, the average permeability and the modified average permeability of the tank would be determined in the manner set forth above.

In one preferred embodiment, before the first sulfonation treatment (stage (A) or (A1), defined below) of the process of this invention is initiated, the surface of the container to be treated is purged with an inert gas, such as dry air, to remove any moisture.

The process of this invention comprises the stages of: conducting a first sulfonation treatment; and, subsequently, conducting a second sulfonation treatment.

In one embodiment, also referred to herein as a first embodiment, the first stage (A), also referred to herein as the first sulfonation treatment, comprises the steps of:

(i) contacting a normally solid, polymer surface of the container at a temperature of about 115° to about 140°, preferably at about 120° to about 140°, more preferably at about 120° to about 135° and most preferably at about 130° F., with a first sulfur-containing compound;

(ii) contacting the surface with a first neutralizing agent; and (iii) washing the surface with an aqueous liquid.

In this embodiment, the second stage (B), also referred to herein as the second sulfonation treatment, comprises the steps of:

(i) contacting the surface, at a temperature of about 115° to about 140°, preferably at about 120° to about 140°, more preferably at about 120° to about 135°, and most preferably at about 130° F., with a second sulfur-containing compound;

(ii) contacting the surface with a second neutralizing agent; and (iii) washing the surface with an aqueous liquid.

The stages (A) and (B) are carried out for a sufficient period of time and with sufficient concentrations of the first sulfur-containing compound, the second sulfur-containing compound, the first neutralizing agent and the second neutralizing agent, so that the container has average permeability to unleaded gasoline of not greater than about 0.021 g/hr, and preferably not greater than about 0.016 g/hr, and modified average permeability of not greater than about 0.021 g/hr, preferably not greater than about 0.014 g/hr.

In an alternative embodiment, the first stage (A1), also referred to herein as the first sulfonation treatment, comprises the steps of:
(i) contacting a normally solid, polymer surface of the container at a temperature of about 115° to about 140°, preferably about 120° to about 140°, more preferably at about 120° to about 135° and most preferably at about 130° F., with a first sulfur-containing compound; and
(ii) washing the surface with an aqueous liquid.

In this alternative embodiment of the invention, the second stage (B1), also referred to herein as the second sulfonation treatment, comprises the steps of:
(i) contacting the surface, at a temperature of about 115° to about 140°, preferably at about 120° to about 140°, more preferably at about 120° to about 135°, and most preferably at about 130° F., with a second sulfur-containing compound;
(ii) contacting the surface with a neutralizing agent; and
(iii) washing the surface with an aqueous liquid.

The stages (A1) and (B1) are carried out for a sufficient period of time and with sufficient concentrations of the first sulfur-containing compound, the second sulfur-containing compound, and the neutralizing agent that the container has average permeability to unleaded gasoline of not greater than about 0.021 g/hr, preferably not greater than about 0.016 g/hr, and modified average permeability of not greater than about 0.021 g/hr, preferably not greater than about 0.014 g/hr. In this alternative embodiment of the invention, the container is made from the same polymer as is used to make the container of all the other embodiments of this invention.

The neutralizing agent used in the stage (B1) of this embodiment is the same as the second neutralizing agent used in the embodiment requiring the use of the neutralizing agents in stages (A) and (B). Suitable neutralizing agents used in all embodiments are discussed in detail below.

The remainder of the specification will be directed to all embodiments of the invention, unless specifically indicated otherwise.

The surface of the container treated in the two stage sulfonation process of this invention is an interior surface, an exterior surface, or both, the interior and the exterior surfaces of the container. Accordingly, the surface subjected to the contacting and washing steps, such as steps (A)(ii), (A)(iii), (A1) (ii), (B)(i), (B)(ii) and (B)(iii), is the surface subjected to the contacting step, such as step (A)(i).

After the second sulfonation treatment is completed, the surface comprises about 200 to about 1500, preferably about 500 to about 1500, and most preferably about 800 to about 1200 micrograms of sulfur per square inch (mcg/in$^2$). The surface sulfur content may be measured by any suitable means, but, preferably, it is measured by an X-ray fluorescence method with, for example, Panalyzer 4000 model, manufactured by Panametrics, Inc. of Waltham, Mass.

After the two stage sulfonation process is completed, the surface of the container is penetrated by the sulfur-containing compound to an average depth of at least about 10, preferably at least about 15, and most preferably about 15 to about 25 microns. The term "surface of the container is penetrated by the sulfur-containing compound to an average depth of at least about 10 microns" means that the depth of penetration of the sulfur-containing compound, beneath the surface of the container treated in accordance with the process of this invention, averaged for the entire surface of the container, is at least about 10 microns.

The depth of penetration of the sulfur-containing compound into the surface of the container can be determined by any conventional methods known to those skilled in the art, such as, X-ray Photoelectron Spectroscopy (ESCA) or, preferably, by the Auger Electron Spectroscopy Method (AES), described e.g., in *Analytical Chemistry of Surfaces*, JOURNAL OF CHEMICAL EDUCATION, Vol. 61, No. 6, June 1984. As is known to those skilled in the art, presently-known methods of measuring the depth of penetration of the sulfur-containing compound detect the presence of elemental sulfur. In the context of this invention, the detection of elemental sulfur at a given depth beneath the treated surface of the container is a reliable indication of the penetration of the sulfur-containing compound to the same depth. Accordingly, the terms "surface . . . penetrated by sulfur" and "surface . . . penetrated by a sulfur-containing compound" are used interchangeably herein.

The differences between the measurements of the surface sulfur content and the sulfur-containing compound beneath the surface of the container are as follows: the surface sulfur content measurement determines the content of sulfur substantially only on the surface treated with the sulfur-containing compound, while the measurement of the sulfur-containing compound beneath the surface of the container determines the content of sulfur substantially only in the depth of the container wall, beneath the surface treated with the sulfur-containing compound.

Figure 5:
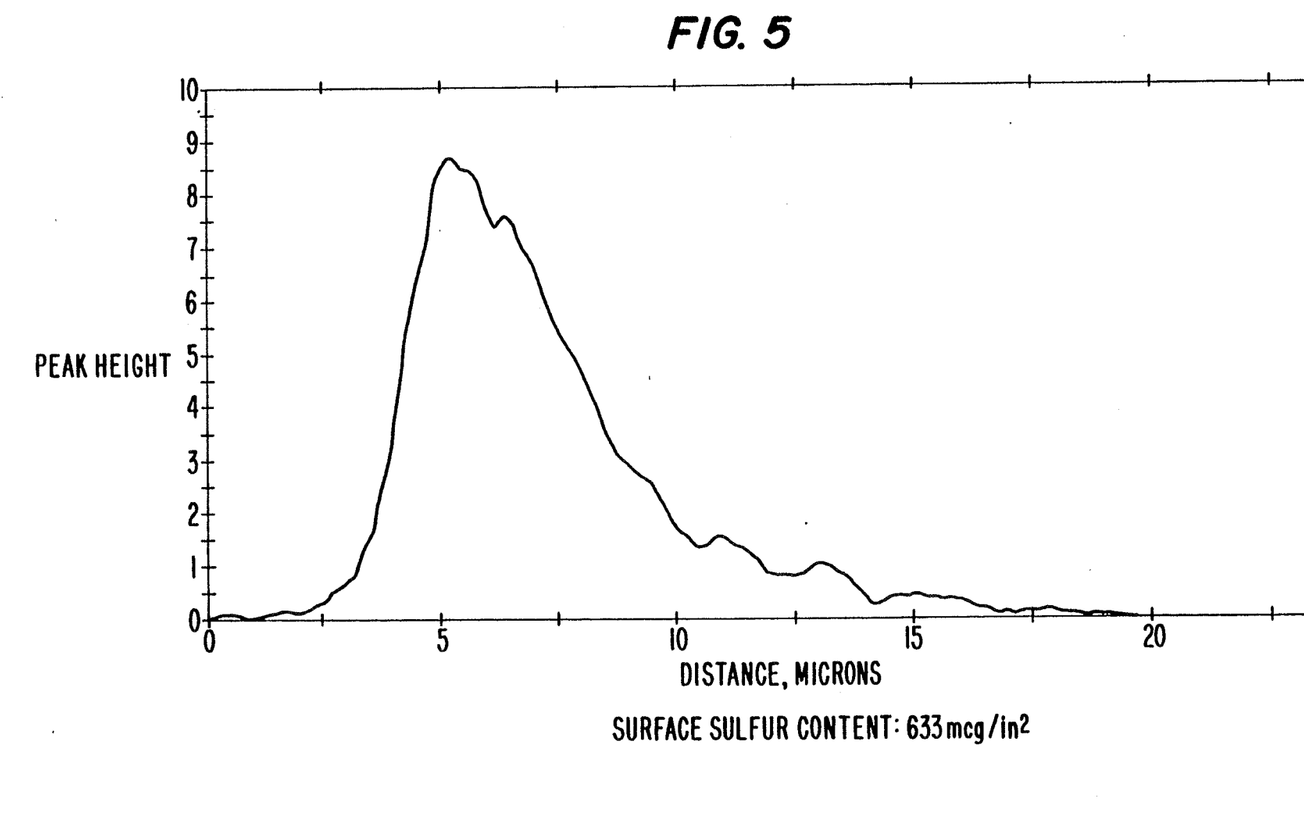
FIG. 5 is a graph of peak height (i.e., the maximum concentration of sulfur at a given depth within the material) of sulfur concentration as a function of the depth of penetration of sulfur in the fuel tank of FIG. 2.
Figure 6:
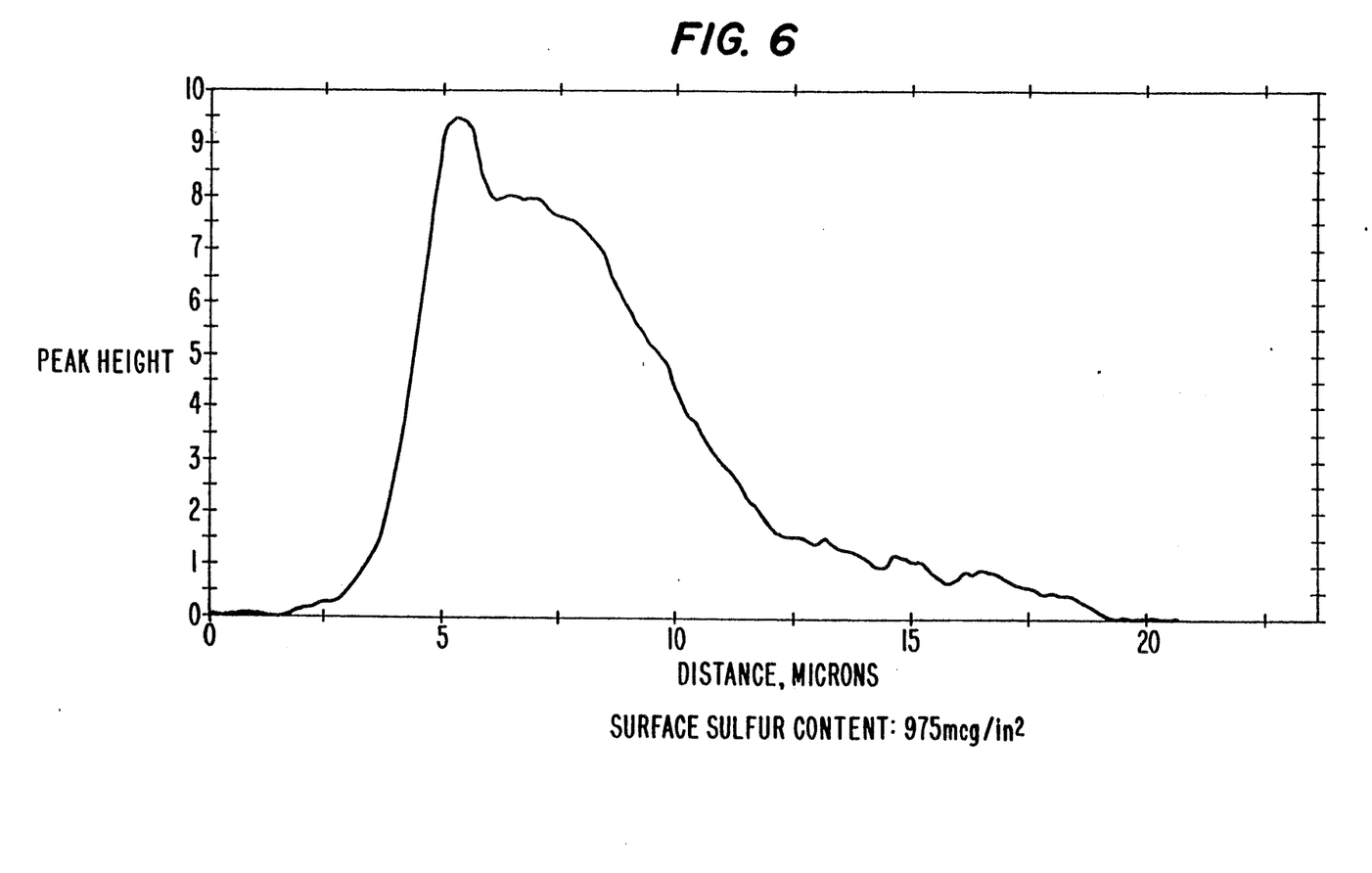
FIG. 6 is a graph of peak height of sulfur concentration as a function of the depth of penetration of sulfur in the fuel tank of FIG. 3.
Figure 7:
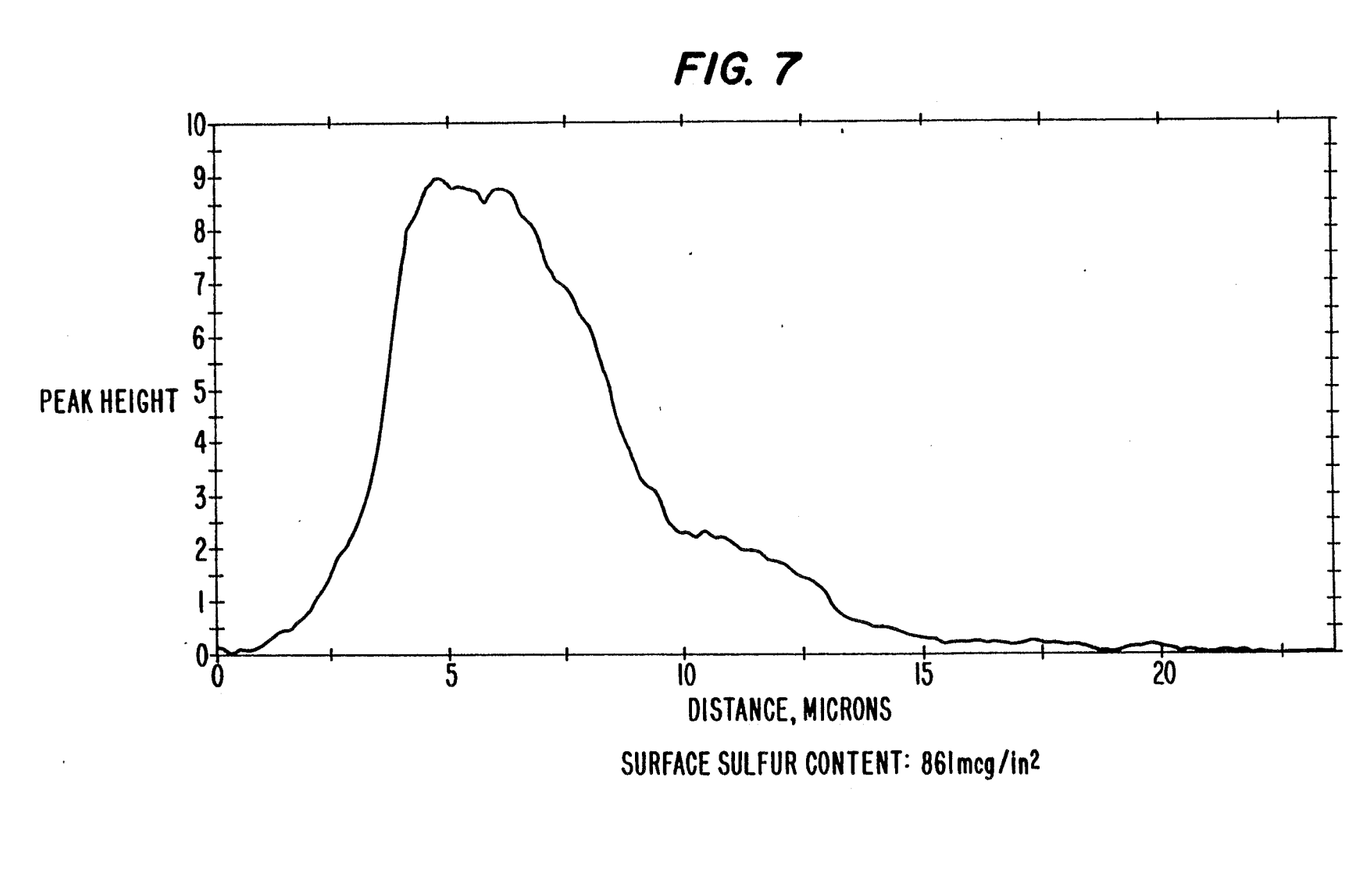
FIG. 7 is a graph of peak height of sulfur concentration as a function of the depth of penetration of sulfur in the fuel tank of FIG. 4.

The surface of the container, after the sulfonation process of this invention is completed, also has a substantially greater density of sulfur than the surface of a comparable container sulfonated according to a prior art single step sulfonation process. This is illustrated by the data of FIGS. 2-7. These figures are photomicrographs of cross-sections of HDPE fuel tanks sulfonated with gaseous SO$_3$ (FIGS. 2-4), and graphical representations of the maximum sulfur concentration as a function of depth of sulfur penetration in the fuel tanks used for photomicrographs of FIGS. 2-4 (FIGS. 5-7, respectively). In particular, FIGS. 2-7 illustrate the results of sulfonating fuel tanks: in accordance with a modified sulfonation procedure of prior art (FIGS. 2 and 5); an embodiment of the two stage sulfonation process of this invention wherein the neutralization step is omitted in the first stage (FIGS. 3 and 6); and, an embodiment of the two stage sulfonation process of this invention wherein both stages include the neutralization step (FIGS. 4 and 7). The fuel tank whose photomicrograph is enclosed in FIG. 2 (and whose sulfur compound penetration depth profile is illustrated in FIG. 5) was sulfonated at conditions distinct from the prior art sulfonation processes. For example, the temperature in the sulfonation process used to sulfonate the tank photographed in FIG. 2 was 115° F., while the typical prior art sulfonation process is conducted at about 70° F.

Figure 2:
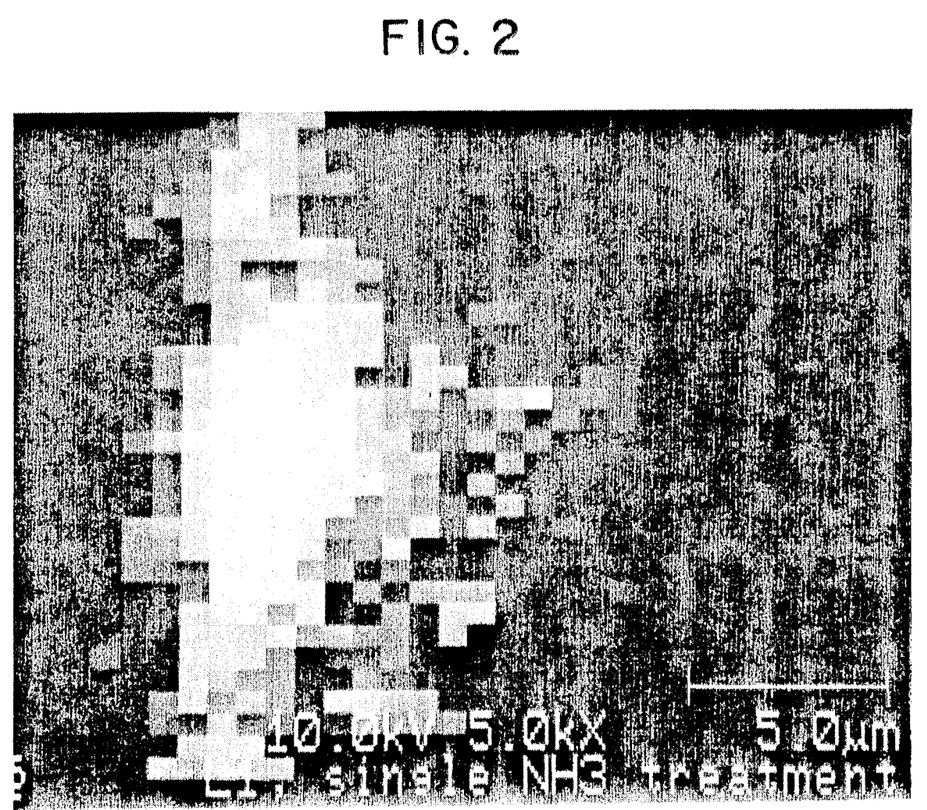
FIG. 2 is a photomicrograph of a cross-section of a fuel tank sulfonated according to a modified single step prior art process at a temperature of about 115° F., with gaseous SO$_3$, at SO$_3$ concentration of about 25% by volume and the exposure to SO$_3$ for about 163 seconds.

Similarly, the tank photographed in FIG. 2 was sulfonated with the SO₃ concentration of about 25%, while a typical SO₃ concentration in the prior art sulfonation process is about 10-about 15% by volume.

The data of FIGS. 2 and 5 represents results obtained with a single stage prior art sulfonation process conducted at substantially the same conditions as the two stage sulfonation process of this invention, the results of which are illustrated in FIGS. 3, 4, 6 and 7. Accordingly, FIGS. 2-7 do not provide a meaningful side-by-side comparison of a prior art single stage sulfonation process to the two stage sulfonation process of this invention. However, these Figures are presented herein to illustrate a substantial improvement in depth and density of sulfur obtained with the two stage process of this invention as compared to the modified prior art single step sulfonation process. The photomicrographs of FIGS. 2-4 and FIGS. 5-7 were obtained with a Scanning Auger Microprobe made by Perkin-Elmer.

As shown in FIGS. 5-7, the depth of penetration of sulfur in fuel tanks sulfonated in the two stage process of this invention (FIGS. 6 and 7) is substantially greater than in the fuel tank sulfonated according to the modified prior art single step sulfonation process (FIG. 5). As shown in FIGS. 6-7, the depth of sulfur penetration in the fuel tanks sulfonated in the two stage process is about 15-about 19 microns. In contrast, the depth of penetration of sulfur in the fuel tank sulfonated in the single step sulfonation process (FIG. 5) is about 10-about 12 microns. It is important to note that the fuel tank analyzed in FIG. 5 was sulfonated at a higher temperature (about 115° F.) and to a substantially higher surface sulfur content (633 mcg/in$^2$) than a typical fuel tank of prior art (usually sulfonated at about 70° F. and to a surface sulfur content of about 200-about 400 mcg/in$^2$). Accordingly, the comparison of surface sulfur content in the fuel tanks sulfonated according to the two stage process of this invention to the fuel tanks sulfonated according to a typical single step prior art sulfonation process is expected to illustrate even greater contrast in the depth of sulfur penetration than FIGS. 5-7.

Figure 3:
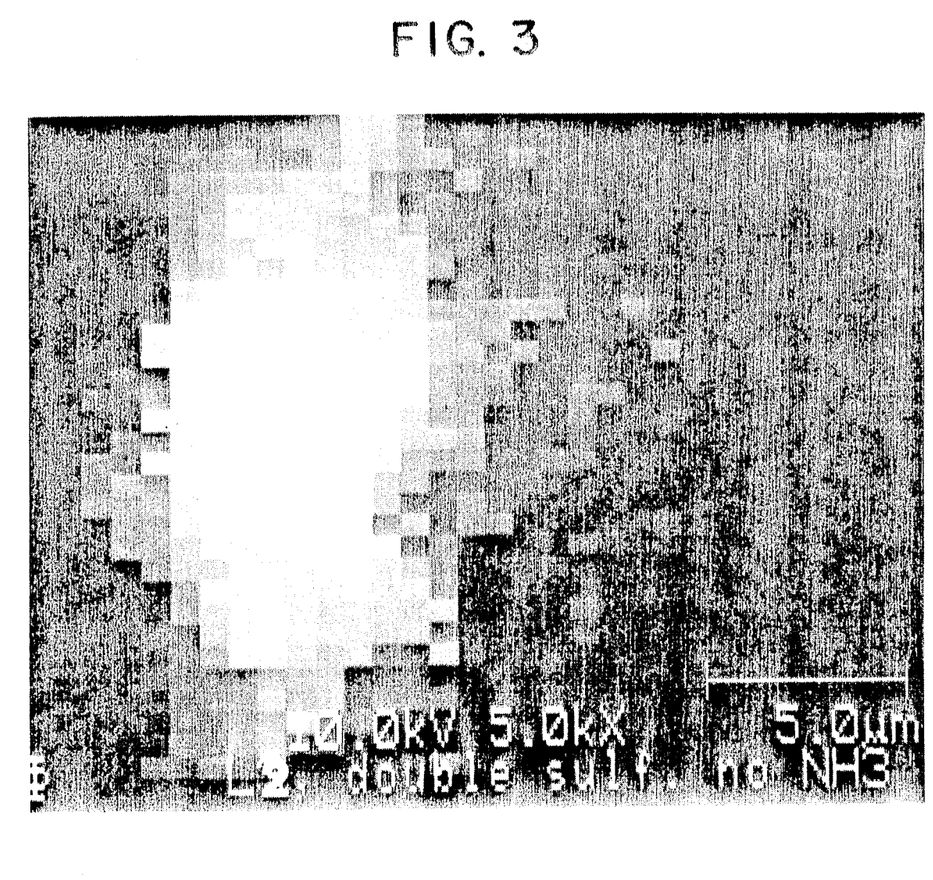
FIG. 3 is a photomicrograph of a cross-section of a fuel tank sulfonated in one embodiment of the two stage sulfonation process of this invention at a temperature of about 115° F., with gaseous SO$_3$ at the SO$_3$ concentration of about 25% by volume and the exposure to SO$_3$ for about 163 seconds. The first sulfonation stage of the process used to sulfonate the tank comprised no neutralization step, whereas the second stage comprised the neutralization step, carried out with NH$_3$.
Figure 4:
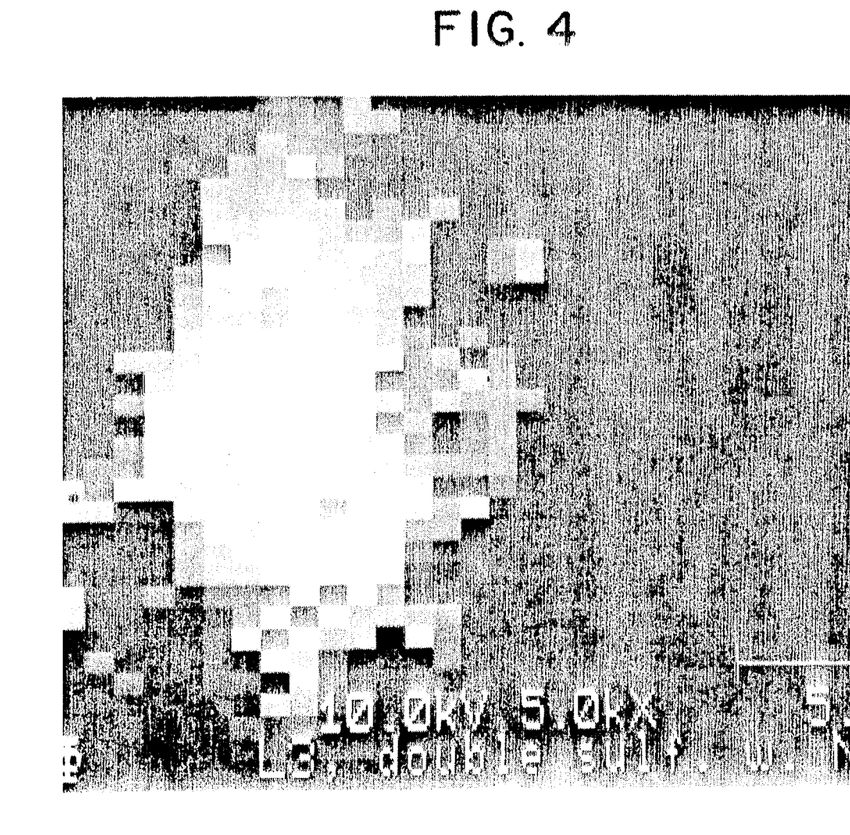
FIG. 4 is a photomicrograph of a cross-section of a fuel tank sulfonated in one embodiment of the two stage sulfonation process of this invention at a temperature of about 115° F. with gaseous SO$_3$ at the SO$_3$ concentration of about 25% by volume and the exposure to SO$_3$ for about 163 seconds. Both stages of the sulfonation process comprised the neutralization step, carried out with NH$_3$.

FIGS. 2-4 also illustrate the density of sulfur beneath the surface of the sulfonated tanks. The presence of sulfur is indicated by the solid white color in these Figures, and the density of sulfur is directly proportional to the uniformity and depth of penetration of the solid white color into the thickness of the wall of the container. The solid white color at the surface of the fuel tank in FIG. 3 is substantially more uniform, deeper and substantially devoid of black-colored regions (indicating sulfur compound-free areas) and gray regions (indicating relatively low sulfur compound concentration areas) than in FIGS. 2 or 4. This indicates that density of the sulfur compound in the fuel tank sulfonated in the two stage sulfonation process of this invention, wherein the neutralization step is omitted in the first stage, is substantially higher than in the fuel tank sulfonated by the single step sulfonation process (FIG. 2). This also indicates that density of the sulfur compound in the fuel tank sulfonated in the two stage sulfonation process, wherein the neutralization step is omitted in the first stage, is higher than in the fuel tank sulfonated in the two stage sulfonation process, wherein the neutralization step is present in the first stage (FIG. 4).

The temperature of the container is increased prior to the first sulfonation treatment to about 115° to about 140°, preferably about 120° to about 140°, more preferably about 120° to about 135°, and most preferably about 130° F. by any conventional means. In one preferred embodiment of the invention, the temperature of the container is increased, prior to the commencement of the sulfonation process, by blowing hot air into the interior of the container. The temperature of the container is measured, at the same time, by a temperature sensor placed on the outside wall of the container. When the sensor registers the desired temperature, the flow of hot air is terminated. Subsequently, the container is subjected to the sulfonation process of this invention.

The length of exposure of the container to the hot air, in this preferred embodiment of the invention, will depend on the initial temperature thereof. For example, if the container is stored, prior to the sulfonation process, at a relatively low ambient temperature, the length of exposure thereof to hot air will be relatively long to increase the temperature of the container to the aforementioned required temperature of about 115° to about 140° F. Conversely, if the temperature of the container is above ambient temperature because, for example, the blowmolded container is ejected from the blow mold shortly before the sulfonation process, the time of exposure of the container to the hot air in this preferred embodiment will be relatively short to increase the temperature of the container to the required temperature range of about 115° to about 140° F.

In the steps (A)(i) and (A1)(i), the container is contacted with the first sulfur-containing compound for at least about 160 seconds, preferably for at least about 175 seconds, more preferably for about 240 to about 420 seconds, and most preferably for about 270 to about 420 seconds. In one preferred embodiment of the invention, the container is contacted in the steps (A)(i) and (A1)(i) with the sulfur-containing compound for about 290 seconds.

In the steps (B)(i) and (B1)(i), the container is contacted with the second sulfur-containing compound for at least about 160 seconds, preferably for at least about 175 seconds, more preferably for about 240 to about 420 seconds, and most preferably for about 270 to about 420 seconds. In one preferred embodiment, the container is contacted in the steps (B)(i) and (B1)(i) with the second sulfur-containing compound for about 290 seconds.

The term "contacting ... the surface with ... a sulfur-containing compound", as used herein, includes the actual contact of the selected surface of the container with the first or the second sulfur-containing compound and the subsequent period of soaking the surface with the sulfur-containing compound. In the stages (A), (A1), (B) and (B1), after the actual contact of the selected surface of the container with the first or the second sulfur-containing compound, the respective sulfur-containing compound is allowed to soak into the surface of the container.

In one preferred embodiment, the entire two stage sulfonation process of this invention is conducted with the apparatus substantially the same as that of British Patent specification 1,595,928, incorporated herein by reference in its entirety.

Any inorganic sulfur-containing compound may be used in the two stage process of this invention. The same or different sulfur-containing compounds may be used in the stages (A), (A1), (B) and (B1). Suitable sulfur-containing compounds used in the stages (A), (A1), (B) and (B1) are sulfur, sulfur trioxide, a mixture of methyl chloride and sulfur trioxide (SO₃), or mixtures thereof.

In the stages (A), (A1), (B) and (B1), it is preferred, however, to use a sulfur-containing compound which is a gas at a temperature of about 0° to about 200° F. Accordingly, gaseous sulfur trioxide (SO$_3$) is the most preferred sulfur-containing compound used in the stages (A), (A1), (B) and (B1) of this invention. The vapor phase sulfur-containing compound is preferably used as a mixture with inert gases, such as nitrogen, carbon dioxide, and air. The concentration of the sulfur-containing compound in such a mixture is at least about 15% by volume, preferably about 15 to about 30% by volume, and most preferably about 25 to about 30% by volume. In one particularly preferred embodiment, the concentration of the sulfur-containing compound, such as SO$_3$, in the mixture with dry air is about 30% by volume. The inert gas should be substantially free of moisture to prevent any adverse reaction between the sulfur-containing compound and water.

If the sulfur-containing compound is a liquid, and it is used as a mixture with other liquids, the concentration thereof is substantially the same as set forth above for gaseous mixtures, i.e., at least about 15%, preferably about 15 to about 30%, and most preferably about 25 to about 30% by volume.

After the surface of the container is contacted with the sulfur-containing compound, the surface is neutralized by contacting it with a neutralizing agent, e.g., in the steps (A)(ii), (B)(ii) and (B1)(ii). The neutralization step is preferably conducted at an ambient temperature.

Examples of suitable neutralizing agents are alkali metal hydroxides or salts of weak acids and the alkali metals, alkaline earth metal hydroxides or salts of weak acids and the alkaline earth metals, heavy metal chlorides or sulfates, primary, secondary or tertiary amines, ammonium hydroxide, or mixtures thereof.

Examples of alkali metal hydroxides and weak acid salts thereof are sodium hydroxide, potassium hydroxide, lithium hydroxide, sodium carbonate, sodium hypochlorite, sodium bicarbonate, sodium acetate, potassium carbonate, potassium bicarbonate, potassium acetate, lithium carbonate, lithium bicarbonate and lithium acetate.

Examples of alkaline earth metal hydroxides or weak acid salts thereof are calcium hydroxide, barium hydroxide, strontium hydroxide, magnesium hydroxide, calcium acetate, barium acetate, strontium acetate, magnesium acetate, calcium carbonate, barium carbonate, strontium carbonate and magnesium carbonate.

Examples of the heavy metal chlorides or sulfates which can be used are stannous chloride, ferrous sulfate, nickel sulfate, cobalt sulfate and manganese sulfate.

Examples of the amines which can be used are primary, secondary and tertiary saturated aliphatic amines of 2-5 carbon atoms which, preferably, are liquids at ambient conditions and are water soluble. Specific examples of such amines are methylamine, ethylamine, propylamine, butylamine, pentylamine, dimethylamine, diethylamine, dipropylamine, dibutylamine, dipropylamine, trimethylamine, triethylamine, tripropylamine, tributylamine, tripentylamine, diethylmethylamine, dimethylethylamine and dimethylpropylamine. In one preferred embodiment, the neutralizing agent used in the steps (A)(ii) and (B)(ii) is ammonia or calcium carbonate.

The neutralizing steps, such as steps (A)(ii), (B)(ii) and (B1)(ii), are suitably conducted by adding the aforementioned neutralizing agent(s) to water in such an amount that the resulting solutions comprise about 1 to about 20% by weight of the neutralizing agent. The solutions are then sprayed onto the container surface to be neutralized. The contact time of the neutralizing agent with the surface in each of the neutralizing steps is such that at least about 90%, preferably about 95 to about 100% of the sulfonate groups (if sulfur trioxide is used as the sulfur-containing compound) on the surface of the container is converted to the corresponding salts thereof. If a sulfur-containing compound other than sulfur trioxide is used, the contact time of the neutralizing agent with the surface is such that at least about 90%, preferably about 90 to about 100%, of the sulfur-containing groups formed by such a compound on the surface is converted to corresponding salt groups thereof. The sulfonate groups (and/or sulfur-containing groups) are believed to be neutralized only on the surface of the container, since we believe that it is difficult, if not impossible, to neutralize a substantial proportion of sulfonate groups (and/or other sulfur-containing groups) which penetrate beneath the surface of the container. The extent of neutralization can be easily determined by those skilled in the art in a conventional manner.

After the neutralizing steps are completed, the treated surface of the container is washed with an aqueous liquid, preferably water, e.g., in the steps (A)(iii), (A1)(iii), (B)(iii) and (B1)(iii), to remove any remnants of the sulfonation process.

The pressure at which the sulfonation and the neutralization steps are conducted can be atmospheric, super-atmospheric or subatmospheric. For purposes of convenience, however, both of these steps are carried out at atmospheric pressure.

We found that the process of this invention produces containers having decreased permeability, as compared to containers sulfonated in accordance with the heretofore-known processes. Most of such heretofore-known processes of which we are aware were one step sulfonation processes.

For example, the HDPE containers produced in accordance with the present invention, have average permeability to unleaded gasoline of about 10 to about 1%, preferably about 5 to about 1% of comparable containers which had not been subjected to the sulfonation treatment of this invention.

Without wishing to be bound by any theory of operability, it is believed that the reasons for the reduced permeability of the containers produced in accordance with the process of this invention are the combination of:

the elevated temperature during the sulfonation steps, e.g., (A)(i), (A1)(i), (B)(i) and (B1)(i);

the increased concentrations of the sulfur-containing compounds during the sulfonation steps, e.g., (A)(i), (A1)(i), (B)(i) and (B1)(i);

the prolonged sulfonation times, including the soaking periods, for the sulfur-containing compounds during the sulfonation steps, e.g., (A)(i), (A1)(i), (B)(i) and (B1)(i); and the use of two sequential stages in the process of this invention, with each of the stages comprising the treatment of the surface with the sulfur-containing compound and at least one of the stages comprising the step of contacting the surface with a neutralizing agent.

It is believed that these factors produce containers having the above-specified surface sulfur content and depth of penetration of the sulfur-containing compound into their surface which, it is believed, decrease the permeability of the containers to hydrocarbons, such as gasoline, and flex fuels, such as mixtures of gasoline and alcohol.

The following Examples illustrate additional features of the invention. However, it will be apparent to those skilled in the art that the specific reactants and reaction conditions used in the Examples do not limit the scope of the invention.

In the following Examples, Example A (Comparative) illustrates a sulfonation process of prior art; Example B (Comparative) illustrates the effect of increasing the sulfonation treatment temperature on the level of sulfonation of the tank; Example 1 illustrates the two step sulfonation process of this invention; Examples 2-6 summarize the permeability studies conducted with the sulfonated tanks of Examples A, B and 1; Examples 7-8, C and D summarize permeability studies with fuel tanks having approximately the same capacity and wall thickness as, but a different shape than, the tanks of Examples A, B, and 1.

EXAMPLE A

Comparative—Prior Art

This Example is a Comparative Example wherein an automobile fuel tank was treated with a sulfonating agent ($SO_3$) at an ambient temperature (about 72° F) according to a heretofore-practiced sulfonation process.

The tank was a General Motors ("GM") fuel tank for an "L" car, having the capacity of 14 gallons (gal), and the GM part designation of 22569940. The tank was made from HMW HDPE having a density of 0.948 g/cc, flow index ($I_{21}$) of 8.5 g/10 min and containing 0.2% by weight of carbon black. The tank was sulfonated with the apparatus substantially the same as that of British patent specification 1,595,928. The tank was held in an upright position on a sulfonating line, and it was initially purged with dry air for 40 seconds. Subsequently, the interior tank surface was contacted with vapor from an $SO_3$ holding vessel. The interior tank surface was contacted with a gaseous mixture comprising about 15% by mole of $SO_3$ and about 85% by mole of dry air injected into the tank through a nozzle. The $SO_3$ was then allowed to soak into the interior surface of the tank for 138 seconds by keeping the tank on the platforms of the rotary manifold of the sulfonation line for that period of time.

In Example A and in Examples B and C, set forth below, the interior surface of the tanks, after sulfonation, was neutralized by contacting that surface with a humidified ammonia ($NH_3$) mist, comprising about 70% by volume of $NH_3$ and about 30% by volume of air and water. The neutralization step was conducted at 72° F., and at ambient pressure, for 31 seconds. The remnants of the $SO_3$ and $NH_3$ treatment were removed from the surface of each tank by washing the surface with 50 psi water for 35 seconds.

Permeability of the tank was evaluated in the manner set forth below in Examples 3-7. The results of the permeability evaluation of the tank of this Example and of the tanks of the remaining Examples are summarized in Table 1.

EXAMPLE B

Comparative

In this Comparative Example two tanks, one each for Runs 1 and 2, each tank being identical to that of Example A, were sulfonated at an elevated temperature (120° F.) to determine the effect of the increased temperature on the level of sulfonation. Accordingly, all of the remaining sulfonation, neutralization and washing conditions were identical to those of Example A.

EXAMPLE 1

Two Stage Sulfonation Process of the Invention

In this Example, two tanks, one each for Runs 1 and 2, each tank being identical to those used in the Comparative Examples A and B, were subjected to the two stage sulfonation process of this invention.

The tanks were preheated, prior to sulfonation, to 120° F. Subsequently, the inside of each tank was purged with dry air for 46 seconds. The tanks were then sulfonated in the two stage process of this invention. The two stage sulfonation process was substantially the same for Runs 1 and 2, and it is summarized below in detail for Run 1.

In Run 1, the tank was positioned on a platform of the apparatus used in Example A. The interior surface of the tank (an "L" car tank, having the capacity of 14 gal and the GM part designation of 22569940), maintained at the 120° F. temperature, was contacted with $SO_3$. The $SO_3$ was applied to the interior tank surface in the same manner as described above in Example A, i.e., by injecting a gaseous mixture comprising about 15% by mole of $SO_3$ and 85% dry air into the tank through a nozzle. After the $SO_3$ injection was completed, the $SO_3$ was allowed to soak into the interior surface of the tank for 138 seconds, by keeping the tank on the platform of the sulfonation line described in Example A for the aforementioned period of time. The interior of the tank was purged with dry air for 46 seconds. The interior surface of the tank was then contacted for 46 seconds with a mist comprising about 70% by volume of $NH_3$ and about 30% by volume of air and water.

The interior of the tank was purged with compressed air for 46 seconds. Subsequently, the interior surface of the tank was washed with water for about 35 seconds, and dried at a temperature of 120° F. for 10 minutes. The steps of sulfonation with $SO_3$, $SO_3$ soaking, purge with dry air, neutralization with $NH_3$, purge with compressed air, washing and drying were then repeated at exactly the same conditions for exactly the same time periods as set forth above.

EXAMPLES 2-6

Permeability Studies

In these Examples, the tanks of Comparative Examples A and B, and of Example 1 were subjected to permeability studies to determine the permeability of the tanks to unleaded gasoline. The permeability studies were conducted in substantially the same manner for all tanks, summarized below for Example 2, conducted with the tank of Comparative Example A.

The permeability of the tank of Example A was measured by an Isothermal Permeation Test (also referred to herein as a modified Shed Test method).

In summary, the Isothermal Permeation Test comprises, initially conditioning the tank for about twenty one (21) days and then conducting the permeability test. The conditioning treatment comprises filling about 40% of the tank's capacity with the Howell EEE fuel, capping the tank and allowing the tank to soak with the fuel for about twenty one (21) days. During this time, the fuel is periodically agitated.

After the conditioning treatment is concluded, the permeability test is conducted. The Isothermal Permeation Test was conducted over a period of about 245–247 days, at time intervals of about 30 days. The permeability measurements after 185–187, 214–220 and 245–247 days are reported in Table 1.

TABLE 1

Sulfonation Treatment

| Ex. | Tank of Ex. | Sulf. Type | Sulf. Temp. (°F.) 1st Stage | Sulf. Temp. (°F.) 2nd Stage | $SO_3$ Contact Time Inc. Soaking (sec) 1st Stage | $SO_3$ Contact Time Inc. Soaking (sec) 2nd Stage | Final Tank Surface Sulf. Level (mcg $S/in^2$)* |
|---|---|---|---|---|---|---|---|
| 2 | A | 1 stage | 72 | — | 184 | — | 336 |
| 3 | B, Run 1 | 1 stage | 120 | — | 184 | — | 294 |
| 4 | B, Run 2 | 1 stage | 120 | — | 184 | — | 394 |
| 5 | I, Run 1 | 2 stage | 120 | 120 | 184 | 184 | 426 |
| 6 | I, Run 2 | 2 stage | 120 | 120 | 184 | 184 | 426 |

Permeability (g/hr)

| Ex. | Actual After 185–87 Days | Actual After 214–20 Days | Actual After 245–47 Days | Aver. After 185–87 Days | Aver. After 214–20 Days | Aver. After 245–47 Days | Modified Average After 185–187 Days | Modified Average After 214–220 Days | Modified Average After 245–247 Days |
|---|---|---|---|---|---|---|---|---|---|
| 2 | 0.024 | 0.035 | 0.043 | 0.015 | 0.018 | 0.021 | 0.015 | 0.017 | 0.020 |
| 3 | 0.043 | 0.025 | 0.029 | 0.018 | 0.019 | 0.020 | 0.016 | 0.018 | 0.019 |
| 4 | 0.106 | 0.103 | 0.105 | 0.066 | 0.071 | 0.075 | 0.067 | 0.073 | 0.078 |
| 5 | 0.040 | 0.057 | 0.030 | 0.021 | 0.026 | 0.015 | 0.019 | 0.023 | 0.021 |
| 6 | 0.021 | 0.024 | 0.025 | 0.012 | 0.014 | 0.014 | 0.012 | 0.014 | 0.014 |

*Approximated levels.

The results indicate that the two stage process of this invention produces fuel tanks having reduced permeation to the Howell EEE fuel, which is a type of unleaded gasoline.

EXAMPLES 7–8,

C (Comparative) and D (Comparative)

Permeability Studies

In these Examples, the fuel tanks having approximately the same capacity and wall thickness as, but a different shape than, the tanks of Examples A–B, and 1 were subjected to permeability studies to determine the permeability of the tanks to a flexible fuel comprising 85% by volume of unleaded gasoline and 15% by volume of methanol. The permeability studies were conducted using the ECE 34 Test. In the ECE 34 test, the tank is filled with the fuel to about 40- about 50% of its capacity, and it is allowed to stand, undisturbed, in a controlled environment at a temperature of about 104° F. (40° C.) and Reid Vapor Pressure (RVP) of 9 psig for a period of about four (4) weeks. Thereafter, the permeability of the tank to the fuel is measured by the method comprising measuring the tank weight loss (in grams/day) on a weekly basis. The measurements are usually conducted over a period of eight (8) weeks. However, in these Examples, i.e., Examples 7–8, C (Comparative) and D (Comparative), the measurements were conducted for about twenty three (23) weeks. In Examples 7–8, C (Comparative) and D (Comparative) the permeability studies were conducted at Reid Vapor Pressure of 14 psig.

The tanks of Examples 7 and 8 were sulfonated according to the two stage process of this invention. The first stage comprised the steps of contacting the interior surface of the tanks with a gaseous mixture of about 75% of dry air and about 25% (by volume) of $SO_3$ for about 282 seconds at about (120° F.), and, subsequently, neutralizing the surface with a gaseous ammonia-containing mist comprising about 70% by volume of ammonia ($NH_3$) and about 30% by volume of air and water. The interior tank surface was then purged with compressed air for 46 seconds, washed with water and dried. The second stage was substantially the same as the first stage. The tanks in Examples 7 and 8 had surface sulfur levels of about 861 mcg/in$^2$. The results of this evaluation are graphically illustrated in FIG. 1.

Additionally, one tank identical to that of Example 7, but untreated with sulfur (Example C, Comparative), and one tank identical to that of Example 7, but treated by a previously-known one step sulfonation process, i.e., a tank sulfonated at ambient temperature to such an extent that it had surface sulfur concentration of about 200 to about 400 mcg/in$^2$ (Example D, Comparative), were also subjected to the same permeability studies. The results of the studies for tanks of Examples C and D are also illustrated in FIG. 1.

Figure 1:
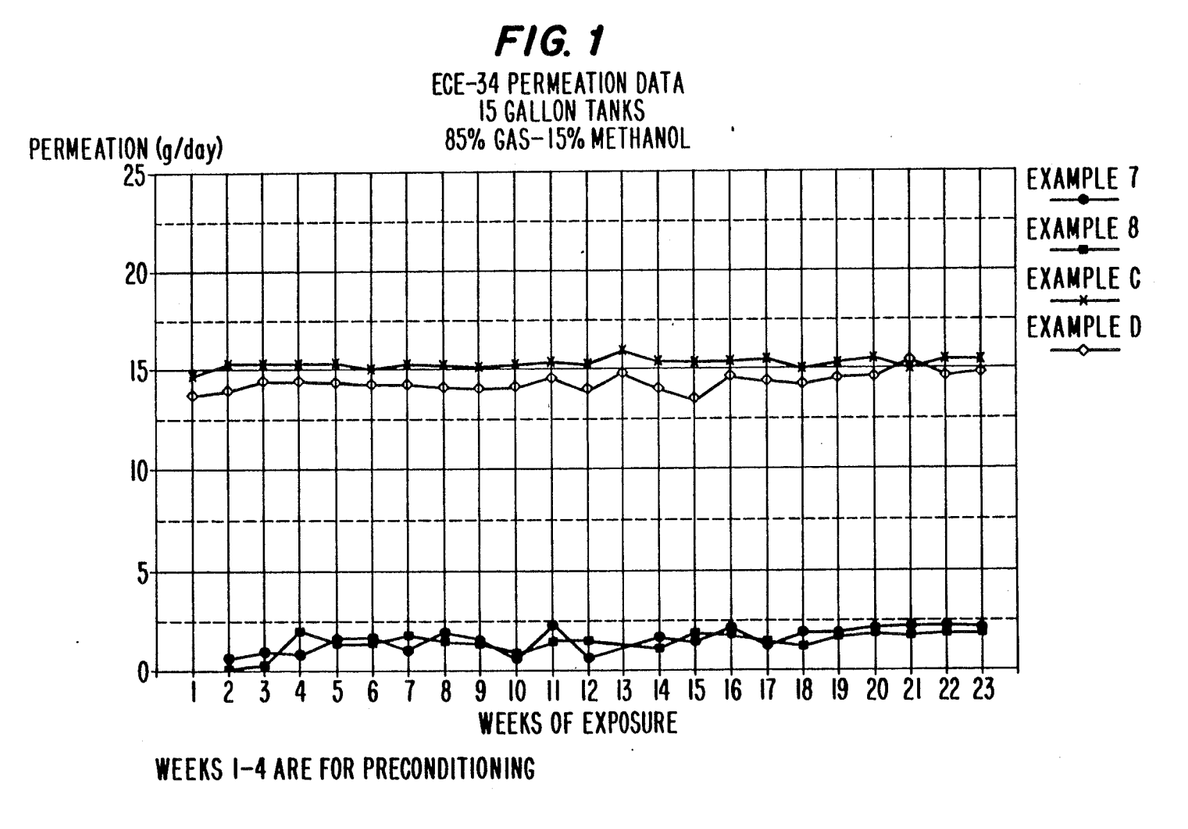
FIG. 1 is a graphical representation of the results of Examples 7-8, C (Comparative) and D (Comparative).

The data of FIG. 1 illustrates the substantial reduction in permeability to flexible fuels of the fuel tanks sulfonated in accordance with the two stage process of this invention, as compared to a comparable unsulfonated fuel tank (Example C, Comparative) and a comparable fuel tank sulfonated according to a prior art sulfonation process (Example D, Comparative).

It will be apparent that specific embodiments discussed above can be successfully repeated with ingredients equivalent to those generically or specifically set forth above and under variable process conditions.

It is therefore intended that the foregoing detailed description be regarded as illustrative rather than limiting, and that it be understood that it is the following claims, including all equivalents, which are intended to define the scope of this invention.

We claim:

1. A process for treating a container comprised of a normally solid, polymer surface with a sulfur-containing compound comprising the stages of:
(A) conducting a first sulfonation treatment comprising the steps of:
 (i) contacting the surface at a temperature of about 115° to about 140° F. with a first sulfur-containing compound;
 (ii) contacting the surface with a first neutralizing agent;
 (iii) washing the surface with an aqueous liquid; and
(B) conducting a second sulfonation treatment comprising the steps of:
 (i) contacting the surface at a temperature of about 115° to about 140° F. with a second sulfur-containing compound;
 (ii) contacting the surface with a second neutralizing agent; and
 (iii) washing the surface with an aqueous liquid,
the stages (A) and (B) being carried out for a sufficient period of time and with sufficient concentrations of the first sulfur-containing compound, the second sulfur-containing compound, the first neutralizing agent and the second neutralizing agent so that the container has average permeability to unleaded gasoline of not greater than about 0.021 g/hr.

2. A process of claim 1 wherein the container has average permeability to unleaded gasoline of not greater than about 0.016 g/hr.

3. A process of claim 2 wherein the container has modified average permeability to unleaded gasoline of not greater than about 0.021 g/hr.

4. A process of claim 3 wherein the container has modified average permeability to unleaded gasoline of not greater than about 0.014 g/hr.

5. A process of claim 4 wherein the first sulfur-containing compound is in a vapor phase.

6. A process of claim 5 wherein the second sulfur-containing compound is in a vapor phase.

7. A process of claim 6 wherein the surface, after the second sulfonation treatment, comprises about 200 to about 1500 micrograms of sulfur per square inch (mcg/in$^2$).

8. A process of claim 7 wherein the surface comprises about 500 to about 1500 mcg/in$^2$ of sulfur.

9. A process of claim 8 wherein the surface comprises about 800 to about 1200 mcg/in$^2$ of sulfur.

10. A process of claim 1 wherein the surface is penetrated by the sulfur-containing compound to an average depth of at least about 10 microns.

11. A process of claim 10 wherein the surface is penetrated by the sulfur-containing compound to an average depth of at least about 15 microns.

12. A process of claim 11 wherein the surface is penetrated by the sulfur-containing compound to an average depth of about 15 to about 25 microns.

13. A process of claim 9 wherein the polymer comprises a linear carbon-to-carbon backbone structure with non-aromatic substituents having a plurality of free hydrogen atoms attached to the carbon atoms.

14. A process of claim 13 wherein the polymer is selected from the group consisting of a homopolymer of ethylene, a homopolymer of propylene, a homopolymer of isobutylene, a homopolymer of butene-1, a homopolymer of methyl pentene-1, a homopolymer of vinyl chloride, a homopolymer of vinylidene chloride, a copolymer of ethylene with propylene, a copolymer of ethylene with isobutylene, a copolymer of ethylene with butene-1, a copolymer of ethylene with pentene-1, a copolymer of ethylene with methyl pentene-1 and a copolymer of ethylene with octene-1.

15. A process of claim 14 wherein the first neutralizing agent is an alkali metal hydroxide or a salt of a corresponding weak acid, an alkaline earth metal hydroxide or a salt of a corresponding weak acid, a heavy metal chloride, a heavy metal sulfate, a primary, secondary or tertiary amine, ammonia, ammonium hydroxide or mixtures thereof.

16. A process of claim 15 wherein the second neutralizing agent is an alkali metal hydroxide or a salt of a corresponding weak acid, an alkaline earth metal hydroxide or a salt of a corresponding weak acid, a heavy metal chloride, a heavy metal sulfate, a primary, secondary or tertiary amine, ammonia, ammonium hydroxide or mixtures thereof.

17. A process of claim 16 wherein the first neutralizing agent is the alkaline earth metal hydroxide, a salt of a corresponding weak acid, ammonia or ammonium hydroxide.

18. A process of claim 17 wherein the first neutralizing agent is calcium carbonate.

19. A process of claim 17 wherein the first neutralizing agent is ammonia.

20. A process of claim 16 wherein the second neutralizing agent is the alkaline earth metal hydroxide, a salt of a corresponding weak acid, ammonia or ammonium hydroxide.

21. A process of claim 20 wherein the second neutralizing agent is calcium carbonate.

22. A process of claim 20 wherein the second neutralizing agent is ammonia.

23. A process of claim 16 wherein the first sulfur-containing compound is sulfur, sulfur trioxide, a mixture of methyl chloride and sulfur trioxide, or a mixture thereof.

24. A process of claim 23 wherein the first sulfur-containing compound is sulfur trioxide.

25. A process of claim 23 wherein the second sulfur-containing compound is sulfur, sulfur trioxide, a mixture of methyl chloride and sulfur trioxide or a mixture thereof.

26. A process of claim 25 wherein the second sulfur-containing compound is sulfur trioxide.

27. A process of claim 26 wherein the container is a fuel container for an automobile.

28. A process of claim 27 wherein the polymer surface comprises high density polyethylene having a density about 0.939 to about 0.959 g/cc.

29. A process for treating a container comprised of a normally solid, polymer surface with a sulfur-containing compound comprising the stages of:
(A1) conducting a first sulfonation treatment comprising the steps of:
 (i) contacting the surface at a temperature of about 115° to about 140° F. with a first sulfur-containing compound;
 (iii) washing the surface with an aqueous liquid; and
(B1) conducting a second sulfonation treatment comprising the steps of:
 (i) contacting the surface at a temperature of about 115° to about 140° F. with a second sulfur-containing compound;
 (ii) contacting the surface with a neutralizing agent; and
 (iii) washing the surface with an aqueous liquid, the stages (A1) and (B1) being carried out for a sufficient period of time and with sufficient concentrations of the first sulfur-containing compound, the second sulfur-containing compound, and the neutralizing agent so that the container has average permeability to unleaded gasoline of not greater than about 0.021 g/hr.

30. A process of claim 5 wherein the vapor phase first sulfur-containing compound is in the form of a mixture with inert gases comprising at least about 15% by volume of the sulfur-containing 31. A process of claim 30 wherein the mixture comprises about 15 to about 30% by volume of the sulfur-containing compound.

32. A process of claim 31 wherein the mixture comprises about 25 to about 30% by volume of the sulfur-containing compound.

33. A process of claim 32 wherein the mixture comprises about 30% by volume of the sulfur-containing compound.

34. A process of claim 6 wherein the vapor phase second sulfur-containing compound is in the form of a mixture of inert gases comprising at least about 15% by volume of the sulfur-containing compound.

35. A process of claim 34 wherein the mixture comprises about 15 to about 30% by volume of the sulfur-containing compound.

36. A process of claim 35 wherein the mixture comprises about 25 to about 30% by volume of the sulfur-containing compound.

37. A process of claim 36 wherein the mixture comprises about 30% by volume of the sulfur-containing compound.

38. A process of claim 16 wherein the first neutralizing agent is added to water in such an amount that the resulting solution comprises about 1 to about 20% by weight of said neutralizing agent.

39. A process of claim 22 wherein the second neutralizing agent is added to water in such an amount that the resulting solution comprises about 1 to about 20% by weight of said neutralizing agent.

40. A process of claim 1 wherein the container is contacted with the sulfur-containing compound in the stage (A), step (i) for at least about 160 seconds and in the stage (B), step (i) for at least about 160 seconds.

41. A process of claim 40 wherein the container is contacted with the sulfur-containing compound in the stage (A), step (i) for at least about 175 seconds and in the stage (B), step (i) for at least about 175 seconds.

42. A process of claim 41 wherein the container is contacted with the sulfur-containing compound in the stage (A), step (i) for about 240 to about 420 seconds and in the stage (B), step (i) for about 240 to about 420 seconds.

43. A process of claim 42 wherein the container is contacted with the sulfur-containing compound in the stage (A), step (i) for about 270 to about 420 seconds and in the stage (B), step (i) for about 270 to about 420 seconds.

44. A process of claim 43 wherein the container is contacted with the sulfur-containing compound in the stage (A), step (i) for about 290 seconds and in the stage (B), step (i) for about 290 seconds.

45. A process of claim 1 wherein the container is contacted with the first sulfur-containing compound in the stage (A), step (i) at a temperature of about 120° to about 140° F. and with the second sulfur-containing compound in the stage (B), step (i) at a temperature of about 120° to about 140° F.

46. A process of claim 45 wherein the container is contacted with the first sulfur-containing compound in the stage (A), step (i) at a temperature of about 120° to about 135° F. and with the second sulfur-containing compound in the stage (B), step (i) at a temperature of about 120° to about 135° F.

47. A process of claim 46 wherein the container is contacted with the first sulfur-containing compound in the stage (A), step (i) at a temperature of about 130° F. and with the second sulfur-containing compound in the stage (B), step (i) at a temperature of about 130° F.

48. A process for treating a container comprises of a normally solid, polymer surface with a sulfur-containing compound comprising the stages of:
(A) conducting a first sulfonation treatment comprising the steps of:
  (i) contacting the surface at a temperature of about 115° to about 140° F. with a first sulfur-containing compound, in a vapor phase in the form of a mixture with inert gases comprising at least about 15% by volume of the sulfur-containing compound for at least about 160 seconds;
  (ii) contacting the surface with a first neutralizing agent in the form of an aqueous solution comprising about 1 to about 20% by weight of the first neutralizing agent;
  (iii) washing the surface with an aqueous liquid; and
(B) conducting a second sulfonation treatment comprising the steps of:
  (i) contacting the surface at a temperature of about 115° to about 140° F. with a second sulfur-containing compound, in a vapor phase in the form of a mixture with inert gases comprising at least about 15% by volume of the sulfur-containing compound for at least about 160 seconds;
  (ii) contacting the surface with a second neutralizing agent in the form of an aqueous solution comprising about 1 to about 20% by weight of the second neutralizing agent; and
  (iii) washing the surface with an aqueous liquid,
to produce a container which has an average permeability to unleaded gasoline of not greater than about 0.021 grams/hour (g/hr).

49. A process of claim 48, wherein the polymer is selected from the group consisting of a homopolymer of ethylene, a homopolymer of propylene, a homopolymer of isobutylene, a homopolymer of butene-1, a homopolymer of methyl pentene-1, a homopolymer of vinyl chloride, a homopolymer of vinylidene chloride, a copolymer of ethylene with propylene, a copolymer of ethylene with isobutylene, a copolymer of ethylene with butene-1, a copolymer of ethylene with pentene-1, a copolymer of ethylene with methyl pentene-1 and a copolymer of ethylene with octene-1.

50. A process of claim 49 wherein the first and the second sulfur-containing compound is sulfur trioxide.

51. A process of claim 50 wherein the polymer is a high molecular weight, high density polyethylene having a density of about 0.939 to about 0.959 g/cc.

* * * * *